UNITED STATES PATENT OFFICE.

FREDERICK WALTON, OF HAUGHTON DALE, DENTON, NEAR MANCHESTER, ENGLAND.

IMPROVED MODE OF TREATING DRYING-OILS FOR MANUFACTURE OF VARNISH AND OTHER PURPOSES.

Specification forming part of Letters Patent No. 33,722, dated November 12, 1861.

*To all whom it may concern:*

Be it known that I, FREDERICK WALTON, of Haughton Dale, Denton, near Manchester, England, a subject of the Queen of Great Britain, have invented or discovered new and useful Improvements in the Manufacture of Varnish and in Treating Oils, also in the application of products obtained therefrom; and I, the said FREDERICK WALTON, do hereby declare the nature of the said invention and in what manner the same is to be performed to be particularly described and ascertained in and by the following statement thereof—that is to say:

This invention has for its object improvements in the manufacture of varnish and in treating oils; also, in the application of products obtained therefrom.

It is well known that when drying-oils are exposed to the action of air or are oxidized they become converted into bodies of a semi-resinous nature. Now, according to my invention, I convert drying-oils into semi-resinous bodies and dissolve these latter in volatile solvents. The preparation thus obtained dries rapidly, like spirit-varnishes, and leaves a flexible and tough film, similar to that produced by the application of oil-varnishes, which take a long time to dry or harden. Drying-oils may be converted into semi-resinous matters by laying a thin film of the oil on a surface of considerable extent and exposing the film to currents of warm air till the change is produced. The semi-resinous matter may be removed from the surface, when it is desired to produce a varnish, by washing the surface in the solvent; or it may be separated by passing the surface between rollers; or, if the process be stopped before the change is complete, it may be separated by placing many layers of the material (usually paper or fabric) on which the oil was laid one over the other and submitting the pile to a heavy pressure.

In order to render the change of the oil, when exposed in thin films, as above mentioned, more rapid, I prepare the oil by driving it, by means of a considerable pressure, through jets or orifices in very fine streams, which are caused to pass through a case constantly supplied with warm air.

The semi-resinous bodies obtained, as above described, from drying-oils may be rendered plastic by heat, and in this state may be applied to fabrics and surfaces, either alone or mixed with other substances, by means of rollers or pressing-surfaces; or the material may, particularly when mixed with fiber, be rolled or pressed out into sheets.

In order that my said invention may be most fully understood and readily carried into effect, I will proceed to describe the manner in which I prefer to operate.

In order to obtain a semi-resinous body, I proceed as follows: I take linseed-oil, perfectly clear and bright, and I mix therewith a suitable drier, preferring to employ from five to ten per cent. of acetate of lead. This mixture I pass in fine streams through warm air. The machine which I prefer to employ for this purpose is that shown in the annexed drawings; but to this machine I make no claim.

Figure 1 is a front view, Fig. 2 a plan, and Fig. 3 a vertical section, of the machine.

$a$ is a pipe leading from a force-pump by which the oil is forced into the vessel $b$. At the bottom of this reservoir is a grating, $c$, the perforations in which are very fine—say one-fiftieth of an inch or less in diameter. The grating is supported on a suitable gridiron-frame beneath it. The oil forced through the perforations falls in a fine shower through the column $d$, and as it falls it comes in contact with a current of air forced in at $e$ by a fan. The two sides of the column are inclosed with glass in order that light may enter the column, as it tends to bleach the oil.

$f$ and $f'$ are sheets of perforated zinc. Through the sheet $f$ the air enters the column, and through the sheet $f'$ it escapes from it. These perforated sheets diffuse the air entering at $e$ and prevent the fine streams of oil from being blown out of the column. The current of air that passes through the apparatus need not be very strong, as all that is required is constantly to change the air in the column.

The front of the apparatus may either be left open, as is shown, or a casing may be employed to conduct the air which has been brought in contact with the oil into a flue. The oil descends into a cistern, $g$, under the bottom of which is a steam-space, $h$, by which the oil under treatment is kept at a temperature between 212° and 550° Fahrenheit. When the higher temperatures, however, are employed, it is convenient to substitute for steam as a heating medium a bath of a fusible metal, such as tin or an alloy of tin and lead. The higher the temperature the more rapid will the process become.

$i$ is a pipe communicating with the oil-pump, for taking the oil from the cistern $g$ and returning it to the top reservoir, $b$. Thus the same oil is kept circulating through the machine until it is judged to be sufficiently viscid for the purpose for which it is required. At the top of the reservoir $b$ is a small cylinder, $j$, in which a piston, $k$, works. $l$ is a lever in connection therewith, weighted to the pressure which it is desired to maintain in the vessel $b$. From the lever $l$ a rod, $m$, descends, and is connected with a cock in the pipe $i$ in such a manner that when the piston $k$ rises from excess of pressure the communication between the oil-pump and the cistern $g$ is cut off.

In some cases, particularly when it is desirable to work with as little lead as possible, I boil the oil in the usual manner of boiling linseed-oil before submitting it to the action of air as above described. I do not add any acetate of lead after the boiling operation, and during the subsequent process I do not raise the temperature of the oil to so high a degree as when working with unboiled oil. 212° Fahrenheit is sufficient. The product obtained from boiled oil will be more highly colored than that obtained by the use of unboiled oil.

The process should not be carried so far in the machine above described as materially to reduce the fluidity of the oil, the change into semi-resinous material being afterward completed by spreading the oil in a thin film on an extended surface. For this purpose I run out the oil into tanks, which I make cubical—say three feet every way. Each tank is furnished with an open frame of metal, which will just fit within it, and can be lifted in and out as required.

The frame consists of four uprights, equal in height to the depth of the tank, and suitably framed together, so that when the frame is in its place they stand in the four corners or angles formed by the meeting of the sides. In each corner-post a groove is formed, to serve as a guide for the ends of rods, which are employed as is hereinafter explained. In order to distend in this frame a considerable length of fabric, one end of the fabric is attached to a bar, which is then dropped into the guides in the two uprights at one end of the frame. The fabric is then taken to the other end of the frame and another bar is dropped in over it in the guides in the uprights at the other end of the frame. It is then taken back to the point where it was first made fast and a third bar is dropped in, and so on till the frame is full. If, as I prefer, the bars are made half an inch thick, the frame will take in seventy-two yards of a yard-wide fabric, each layer of which is kept distended and out of contact with the layers above and below it. The fabric which I prefer to employ is a strong cotton cloth, or a stout paper may be used.

The frames, when thus covered, are dipped into the oil-tanks, then drawn out again and suspended above them, and while thus suspended they are submitted to a current of air. It is a convenient arrangement to place a series of oil-tanks in a row side by side in a suitable chamber, and to mount an axis about five or six feet over the row of tanks. These axes have drums mounted on them, and the fabric-frames are connected with these drums by chains, so that by turning the axis the whole of the frames suspended from it can be raised from or lowered into their tanks as may be required. Air is forced into the chamber at one end by a fan, and is allowed to escape at the other end. It is preferred, in order to keep the oil fluid, to heat the oil-tanks by means of steam.

In conducting the process, when a number of frames have been filled with fabric and suspended over their oil-tanks, as above described, they are, by turning the axis from which they are suspended, all simultaneously lowered into the oil-tanks, and are then immediately lifted to their original positions. By this dipping the whole surface of fabric is covered with oil, and any superfluous oil which may be taken up runs back into the oil-tanks. The frames are kept suspended in the current of air by preference until the film of oil is dry and no longer feels tacky when touched. This will take about twenty-four hours; but the time will vary greatly according to the state of the weather. The frames, when dry, are redipped, and the process is thus continued until a thickness of dry oil about one-eighth of an inch in thickness is accumulated on the surfaces of the fabrics. It will take some weeks to obtain a sufficient thickness.

I would remark that it is not essential that the oil should be prepared by the use of the machine shown in the drawings before spreading it in films on a surface, as above described. I prefer, however, that this should be done, as it tends to expedite the process. The frames, when a sufficient thickness of dry oil has been accumulated, are removed and the fabric stripped from them.

If woven fabric has been employed in order to separate the dry oil or semi-resinous matter from the fabric, the same is passed at a slow speed—say about two yards per minute—between two plates heated with high-pressure steam, and having only sufficient space between them to allow of the fabric being passed through conveniently. Just beyond the plates are two rollers, the distance between which is adjustable by screws or otherwise. The end of a length of coated fabric passing between the plates is entered between the rollers, and the semi-resinous matter having been scraped off by hand from a few inches of the fabric, the rollers are caused tightly to nip the end so cleaned. The rollers are then set in motion, and by their pressure they separate the coating from the fabric, the former being constantly pressed back while the fabric passes on between them, and is ready again to be placed on the frames. The semi-resinous matter separated from the fabric is differently treated according to the purpose to which it is to be applied. If it is to be used for coating fabrics to waterproof the same, the semi-resinous matter is passed several times between crushing-rollers heated by steam to break it down and reduce it to a uniform plastic mass. I prefer that one of these rollers should be driven considerably faster than the other, in order that they may have a grinding as well as a crushing action on the material as it passes between them. During this operation I prefer to work in with it powdered gum-lac, either shellac, seed-lac, or button-lac. The quantity of this gum to be employed varies according as it is desired that the coated fabric should be more or less flexible and the composition more or less hard. If great flexibility be required, I add but ten per cent. of gum-shellac, whereas if a hard face is desired I add as much as fifty per cent. When the mixing is complete the composition is spread on the fabric by rollers, as is sometimes practiced with india-rubber and gutta-percha.

In place of completing the kneading of the material by means of rollers, it may, after being passed two or three times between the rollers to crush it completely, be further worked in a masticator, such as is used in the working of india-rubber and gutta-percha. In a similar manner I prepare a composition suitable for rolling out into sheets without fabric, and which sheets may be applied to various useful purposes. In this case, however, I prefer also to mix in flocks in the masticator, or by means of the rollers, to increase the toughness of the sheet. The composition may be rolled into sheets, as is practiced when working gutta-percha, and it may, in a similar manner, be molded by dies and pressure. It is preferred that the dies should be heated. Articles so produced may be rendered very hard by drying them thoroughly in a cool oven.

If it be desired to produce a varnish, the semi-resinous body, when it is removed from the fabric, is passed between very accurately formed and hard rollers, known as "chilled" rolls, and is by them crushed into a sheet about the thickness of tissue-paper. To this alcohol or wood-spirit is added in the proportion of six gallons to nine pounds of semi-resinous material, and the mixture is placed in a still in which a shaft is mounted. It descends through a stuffing-box at the top, and has radial arms mounted on it to stir the mixture, and arms are mounted on the sides of the still itself, between which the arms on the shaft pass. Heat is applied to the mixture until the semi-resinous material is completely dissolved. A portion of the solvent distills over, and may be at once returned to the still or may be employed in a subsequent operation. By distilling off more or less solvent the thickness of the varnish may be regulated as is required, or the varnish may be made by using chilled rollers and working the semi-resinous material along with the solvent until a paste is produced, which may then be completed by heat in the still. For many uses this varnish will be improved by adding to it a solution of shellac or other resins soluble in the same solvent as the semi-resinous body, which tends to harden the varnish.

When the semi-resinous material is to be employed in the manufacture of varnish it is convenient in some cases to expose the films of oil to the action of the air on sheets of paper in place of on a woven fabric of cotton, which I usually employ, and in this case I do not remove the coating from the paper by rollers, as above described, but I place the paper with its coating of semi-resinous matter in the solvent and break up the paper, which I afterward separate by filtration.

Having thus described the nature of my invention and the manner of performing the same, I would have it understood that I do not confine myself to the exact details described; but

What I claim is—

1. As an improved article of manufacture, a varnish as made by converting drying-oil into semi-resinous material, in manner as described, and then dissolving in a solvent, as herein stated.

2. The producing a semi-resinous material from drying-oil by the combined process of exposing it in thin films on a suitable surface to currents of warm air and afterward separating it from the surface either by a solvent or by pressure, as herein described.

3. In the production of the semi-resinous material, as described, the preparing drying-oil by causing it to pass repeatedly in very fine streams through warm air, as herein described.

4. The producing by rollers or otherwise sheets of semi-resinous material, (either alone or mixed with other substances,) the said sheets being either combined with a woven or other fabric or otherwise, as hereinbefore described.

FREDERICK WALTON.

Witnesses:
  GEO. PITT,
  24 *Southampton Buildings, London.*
  THOS. BROWN,
  2 *George Yard, Lombard Street, London.*